United States Patent [19]

Geiling

[11] 4,261,381
[45] Apr. 14, 1981

[54] CROSS-FLOW CONTROLLING VALVE

[75] Inventor: Wolfgang Geiling, Schwebheim, Fed. Rep. of Germany

[73] Assignee: Fichtel & Sachs AG, Schweinfurt, Fed. Rep. of Germany

[21] Appl. No.: 875,814

[22] Filed: Feb. 7, 1978

[51] Int. Cl.³ ............................................. F16K 31/12
[52] U.S. Cl. ................................. 137/101; 137/112
[58] Field of Search ................ 137/112, 113, 118, 101

[56] References Cited

U.S. PATENT DOCUMENTS

| | | | |
|---|---|---|---|
| 1,588,657 | 6/1926 | Christensen | 137/118 X |
| 1,919,430 | 7/1933 | Hewitt | 137/454.6 |
| 2,643,664 | 6/1953 | Willett | 137/101 |
| 2,764,176 | 9/1956 | Darquier | 137/118 |
| 3,618,628 | 11/1971 | Kramer | 137/101 |
| 4,121,601 | 10/1978 | Presley | 137/101 |

FOREIGN PATENT DOCUMENTS

| | | | |
|---|---|---|---|
| 2225905 | 1/1973 | Fed. Rep. of Germany | 137/112 |
| 685203 | 12/1952 | United Kingdom | 137/112 |

*Primary Examiner*—William R. Cline
*Attorney, Agent, or Firm*—Toren, McGeady and Stanger

[57] ABSTRACT

A cross-flow controlling valve for a hydropneumatic vehicle suspension has a casing formed with three ports of which two communicate with longitudinally terminal portions of a bore in the casing. A piston is freely slidable in the bore between two terminal positions. Longitudinally spaced shoulder portions of the bore bound a transversely open, longitudinal groove in the piston which is longer than the intermediate portion of the casing bore connecting the terminal bore portions. Each shoulder portion is dimensioned to bound a throttling gap connecting the groove with one of the terminal bore portions when the shoulder portion is received in the intermediate bore portion. The groove in the piston permanently communicates with the third casing port.

6 Claims, 4 Drawing Figures

CROSS-FLOW CONTROLLING VALVE

The invention relates to a cross-flow controlling valve for two vehicle spring elements connected to a common level regulating valve arranged in a line for pressure fluid between the level regulating valve and the two connected spring elements and consisting of a valve casing which is provided with a bore for receiving a control piston, the control piston permitting almost unthrottled communication between the level regulating valve and the two spring elements in both directions of flow when the pressure in both spring elements is equal, but blocking communcation between the spring elements in the event of a pressure difference.

Such a distributor element for compressed air acting as a cross-flow controlling valve is known from the German patent document No. 1,266,144. The control piston is held by springs in the central position in the T-shaped casing of the distributor element for compressed air. When the spring suspension elements are loaded unilaterally, the suspension element having lower pressure is shut off from its line connection. If the level is raised in this position of the control piston, the spring suspension element already under higher pressure is pumped up further, and the vehicle assumes a sloping position which is not readily reduced spontaneously. A further shortcoming of this design is to be found in the exactly matched springs for the control piston because an exactly central position of the control piston is required at equal pressure in order to avoid faulty control during upward and downward level adjustment.

It is the object of the instant invention to avoid the disadvantages of the known design and to provide a cross-flow controlling valve of simple construction which is very reliable in its operation, ensures satisfactory level control in all driving conditions, and consists of inexpensive, readily produced structural elements.

This object is achieved according to the invention by a control piston freely movable in the bore of the casing and longer than the casing bore, which is provided with at least one longitudinally extending control face symmetrical relative to the center of the control piston, the face being slightly longer than the casing bore, but shorter than the control piston and defining control edges. Because of the free mobility of the control piston in the casing bore, no structural elements are needed that would hold the control piston in its central position. This is facilitated by the design of the control piston, the arrangement of the control face on the control piston according to the invention and the length of the control piston causing hydraulic stabilization. In this manner, the structural elements of the cross-flow controlling valve are very simple to make and therefore inexpensive, and at the same time, optimum operational reliability is achieved by the hydraulic stabilization without any resilient elements acting on the piston.

According to a feature of the invention, the valve casing has inserts provided with sealing faces which are engaged by the frontal face of the control piston in the event of a pressure difference between the two spring suspension elements, the sealing faces at the same time constituting abutments for the control piston in an axial direction. These inserts additionally function as connectors for the lines leading to the spring suspension elements, are simple in their structure and thus easy to make. Additionally, the sealing face for the control piston present on each insert makes it possible that the blocking function is not assumed by the control piston alone, and minor leakage losses, therefore, do not impair operation. As a consequence, the control piston may be guided in the casing bore with relatively great clearance which in turn causes easy mobility of the control piston and additionally reduces the manufacturing cost. Satisfactory sealing of the control piston to the sealing faces of the inserts is achieved, as shown by the invention, by the sealing faces being constituted by resilient seals. These seals may be sealing disks which are either pasted or vulcanized to the inwardly directed surfaces of the inserts, or they may be plastic parts fastened in the bore of the inserts in the manner of hollow rivets.

A central annular chamber is provided for efficient hydraulic connection of the control face with the connecting line leading to the level regulating valve. According to a feature of this invention, this central annular chamber is formed by the control piston having centrally a section of reduced diameter.

According to a further feature of the cross-flow controlling valve of the invention, the control piston is provided with a central bore in which two check valves are arranged, and the central bore is connected with the annular chamber by a radial bore. Because of this arrangement, even very short level lowering periods are possible independently from the instantaneous position of the control piston.

According to an additional feature of the invention, the length of the control piston is matched in such a manner to the variable flow section defined between the control piston and the bore that the flow section for one spring suspension element is just closed when the frontal face of the control piston abuttingly engages the sealing face associated with the other spring suspension element. This permits simultaneous filling of the spring suspension elements even when there exists a pressure difference between the two spring suspension elements.

Further details will become evident from the subsequent description of the drawings in which.

The spring suspension elements of each axle in vehicles having axles whose level is regulated are connected by a line to the level regulating valve. Because the wheel on the outside of a curve is more heavily loaded during travel through a curve than the wheel on the inside of the curve, it is the function of the cross-flow controlling valve to prevent equalization of the pressure between the two spring suspension elements of the axle. On the other hand, the level raising and lowering actions of the spring suspension elements are not to be impeded by the cross-flow controlling valve.

Figure 1:
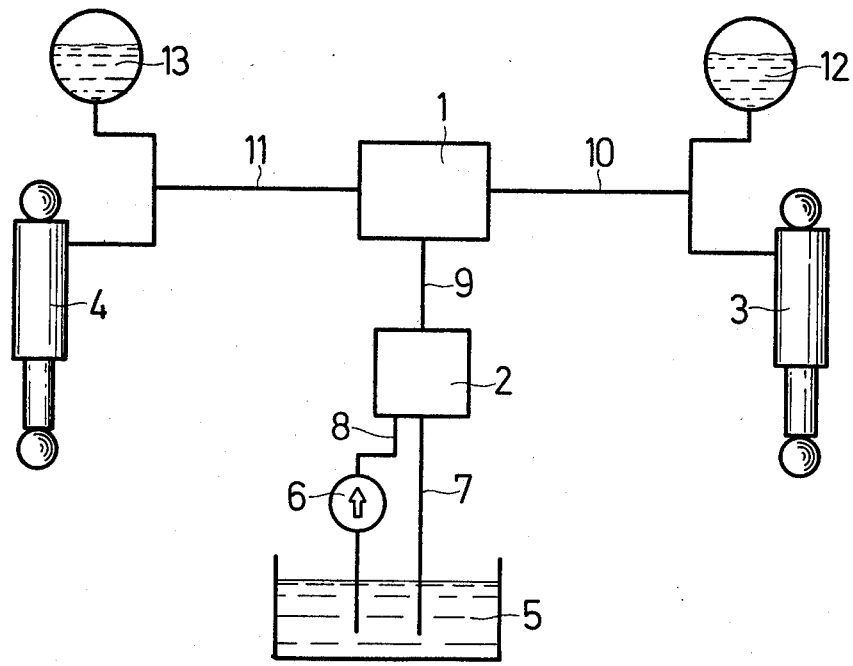
FIG. 1 shows a level regulating arrangement in a conventional manner.

In the conventionally illustrated vehicle level regulating arrangement for one axle according to FIG. 1, the cross-flow controlling valve 1 is connected by the line 10 with the spring suspension element 3 and the associated pressure reservoir 12 whereas the line 11 leads to the left spring suspension element 4 and its pressure reservoir 13. The cross-flow controlling valve 1 communicates with the level regulating valve 2 by way of the line 9. When the level is to be raised, liquid from the storage container 5 is conveyed by the pump 6 through the line 8, the level regulating valve 2, the line 9, the cross-flow controlling valve 1, and the lines 10 and 11 both into the pressure reservoir 12 associated with the spring suspension element 3 and into the pressure reservoir 13 associated with the spring suspension element 4. During level lowering, liquid is drained from the pressure reservoirs 12, 13 through the cross-flow controlling valve 1, the level regulating valve 2, and the return line 7 to the storage container 5.

Figure 2:
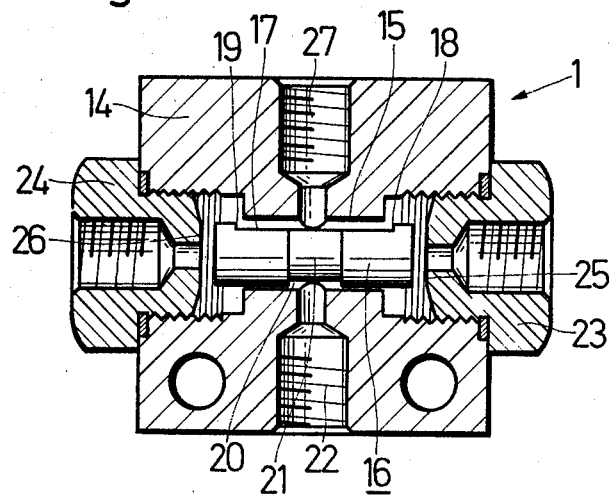
FIG. 2 illustrates the cross-flow controlling valve of the level regulating arrangement in the central position of the control piston.

The cross-flow controlling valve 1 shown in FIG. 2 has in its casing 14 a bore whose reduced central portion 15 receives a control piston 16. The bore portion 15 merges in both directions with terminal bore portions of greater diameter which are threaded for receiving plugs 23, 24 formed with respective ports. The control piston 16 has a transversely open control groove 17 bounded by one (see FIGS. 2-4) or several milled surfaces symmetrical relative to the longitudinally median plane of the control piston and preferably planar. The axial length of the groove 17 is smaller than the length of the control piston 16. The right end of the groove 17 is bounded by a right shoulder 18, the left end by a left shoulder 19 of the piston. In the central position of the control piston 16 shown in FIG. 2, the groove 17 is clearly shown to be slightly longer than the bore portion 15. Passages for the fluid thus are formed between the right shoulder 18 and the right end of the bore portion and between the left shoulder 19 and the left end of the bore portion. The connecting line to the level regulating valve is connected to casing port 22 whereas a port 27 provides, for example, a tap for a minimum pressure switch or a brake arrangement controlled in dependence from a load, and is thus used for additional control tasks, but has no effect on the regulation of the vehicle axle. Both ports 22, 27 communicate through bores with an annular groove 20 in the control piston 16 about a central section 21 of smaller diameter. The right plug 23 as well as the left plug 24 have frontal abutment faces 25, 26 which limit free sliding movement of the control piston 16 from the central position.

At equal pressure in the two spring suspension elements connected to the cross-flow regulating valve 1, the control piston 16 is acted upon by equal pressure both on the right side and on the left side and assumes the position shown in FIG. 2. When the level is being raised, the liquid entering the annular groove 20 through the port 22 from the pressure source flows uniformly through the passages between the shoulders 18, 19 and the ends of the casing bore to the pressure reservoirs associated with each spring suspension element. When the control piston 16 is shifted during the level changing operation by the action of the currents from its central position, a shoulder, for example, the shoulder 18 for the right spring suspension element, increasingly closes the corresponding passage, whereas the passage associated with the left spring suspension element and defined by the shoulder 19 is enlarged. In this event, the left spring suspension element is charged more quickly so that the pressure therein also increases faster than in the other spring suspension element. This unilateral pressure again has a stabilizing effect on the control piston 16 in that the same is now shifted again toward the right by the pressure difference, and both spring suspension element are charged at the same rate in the central piston position. Only the pressure of the hydraulic fluid and the forces generated by the current act on the control piston 16, and the piston thus does not need additional structural elements for stabilization. The control piston 16, therefore, functions as a flow distributor and a piston manometer. A symmetrical charging of the spring suspension elements at different flow amounts is thus ensured.

The level control valve opens a flow path to the storage container for level lowering so that the hydraulic fluid can drain from the spring suspension elements by way of the grooves 17, 20 and the plug 22 in the position of the control piston shown in FIG. 2. If the control piston 16 is shifted from its central position by the influence of currents during the lowering of the level, it unilaterally reduces the flow section, for example, of the right passage defined by the shoulder 18 and the right end of the bore portion 15. The pressure in the right spring suspension element thereby drops more slowly than that in the left spring suspension element. Because of the pressure difference in the spring suspension elements, the piston is shifted further to the left, and the left frontal face of the control piston 16 engages the abutment face 26 of the left plug 24 and closes the port in the abutment face 26 so that no pressure may be withdrawn from the left spring suspension element. Becase the right, cylindrical shoulder of the control piston 16 defines a small annular gap with the bore portion 15, liquid drains from the right spring suspension element through this throttling gap and through the port 22 until equal pressure in both spring suspension elements is established, and the piston is positioned in the middle and thus is hydraulically stabilized, whereby both spring suspension elements are drained symmetrically. The cross-flow controlling valve permits, as described above, a uniform charging and draining of the spring suspension elements without generating a significant pressure difference between the two spring suspension elements. At that, the volumes of liquid during level changes amount to 0.1 to 3 liters per minute. The right and left passages defined by the control piston 16 and the bore portion 15 by means of the shoulders 18, 19 provide a small gap which may amount to about 0.5 mm in the central position.

Figure 3:
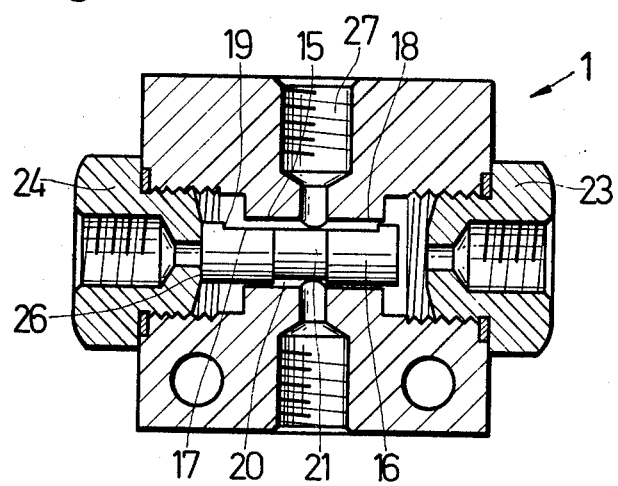
FIG. 3 shows the control piston in the blocked position.

The cross-flow controlling valve is shown in FIG. 3 in a position in which the left frontal face of the control piston 16 engages the abutment face 26 of the left plug, and the right shoulder 18 is located within the bore portion 15. This position corresponds, for example, to the blockage of cross-flow between the two spring suspension elements while the right spring suspension element is under higher pressure, for example, during travel through a curve, than the other spring suspension element. The liquid in the spring suspension element under higher pressure tends to flow into the spring suspension element under lower pressure and thereby entrains the easily movable control piston 16. The right shoulder 18 of the control piston 16 is caused thereby to dip into the bore portion 15 and the left front face of the piston is pressed against the face 26 of the left plug 24. Because a small annular gap is present in this position between the cylindrical right shoulder of the control piston 16 and the bore portion 15, the pressure in the entire cross-flow controlling valve is built up to the higher pressure in the right spring suspension element which is at the higher pressure. Because a lower pressure prevails in the left spring suspension element, the control piston 16 is pressed against the face 16 of the left plug 24, and the control piston 26 is pressed against the abutment face 26 as long as the pressure difference between the left and right spring suspension elements exists. After travel through the curve ends, equal pressure is established in the spring suspension elements, and the left frontal face of the control piston is lifted from the face 26.

The cross-flow controlling valve also permits a raising or lowering of the level in the cross-flow blocking phase, that is, when the pressure differential existing between the spring suspension elements presses the control piston unilaterally against the abutment face of a plug. Liquid is conveyed into the cross-flow controlling valve for raising the level and flows through the groove 20 defined by the section 21 of reduced diameter and the relatively wide passage of the groove 17 into the left terminal bore portion of increased diameter. Because the shoulder 18 on the right side of the control piston 16 dips into the bore portion 15, there is available only the throttling gap defined between the right cylindrical shoulder of the control piston 16 and the bore portion 15 so that liquid can hardly flow into the right space within a short time. The entering pressure liquid thus causes a sudden pressure rise in the left part of the cross-flow controlling valve which shifts the control piston 16 slightly to the right, whereby the port in the left plug is cleared by the left frontal face of the control piston 16, and the previously closed left spring suspension element can be charged. When the charging process is completed before the pressure level in the left spring suspension element equals that in the right spring suspension element, the left frontal face of the control piston 16 at once again engages the face 26 and closes the left spring suspension element. If pressure equality is reached between the two spring suspension elements during level raising, the control piston 16 assumes the central position, and both spring suspension elements are charged uniformly.

When the cross-flow controlling valve is in the blocking phase, the level is lowered by liquid draining from the spring suspension element at higher pressure, for example, the right spring suspension element, through the throttling gap bounded by the cylindrical right shoulder of the control piston 16 in the bore portion 15 until the pressure has dropped slightly below that of the left spring suspension element. The control piston 16 is repelled thereby from the face 26 of the left plug 24 and is held hydraulically in the center position so that the pressure in both spring suspension elements is lowered uniformly now by draining of liquid.

To permit uniform charging of the spring suspension elements in the presence of pressure difference, the length of the control piston 16 is to be chosen such that the shoulder 19 or the shoulder 18 barely dips into the bore portion 15 when the frontal face of the control piston 16 rests on an abutment face, either 25 or 26, of the plug 23 or 24. Because the front face of the control piston 16 is lifted from the sealing face 26 of the plug 24, for example, during charging of the left spring suspension element, and the shoulder 18 simultaneously leaves the bore portion 15, both the left as well as the right spring suspension element can be charged simultaneously notwithstanding a pressure difference between the spring suspension elements.

A port 27 is shown in FIGS. 2 and 3 and is used particularly for a service brake controlled in response to load. Such a brake senses the instantaneous pressure in the spring suspension element as a controlling value. Because the pressure in the cross-flow controlling valve is established in the position of the control piston 16 shown in FIG. 3 according to the spring suspension element under higher pressure due to the throttling gap defined by the cylindrical terminal shoulder portion of the control piston 16 in the bore portion 15, the higher pressure also prevails at the port 27 for the load-controlled service brake so that a service brake controlled according to the load is acted upon in a simple manner by its connection to the cross-flow controlling valve.

Figure 4:
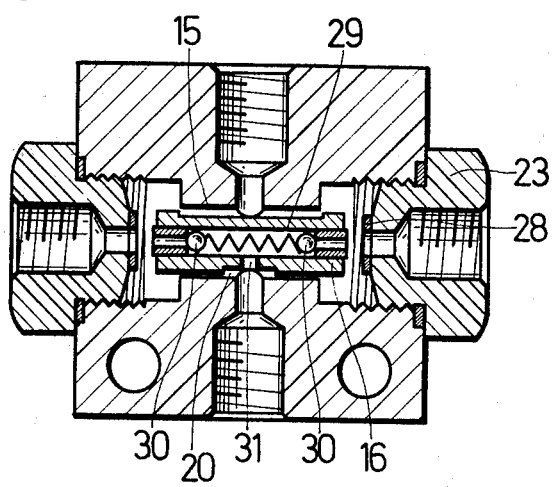
FIG. 4 shows a modified embodiment of the cross-flow controlling valve with check valves in the control piston.

The embodiment according to FIG. 4 differs from that according to FIGS. 2 and 3 essentially by the fact that the abutment face, for example, on the right plug 23 is formed by a seal 28 whereas the control piston 16 has a central bore 29 in which two check-valves 30 are arranged. These check valves 30 consist of tubular valve seats press fitted on both sides and valve balls. Additionally, there is a radial bore 31 which connects the annular chamber 20 with the central bore 29. Such an arrangement is preferred when a very short level-lowering period is required. Though a quick level lowering time is possible in the central position of the control piston 16 even without this valve arrangement, liquid can flow, for example, from the left spring suspension element both through the external throttling gap between the left cylindrical part of the control piston 16 and through the left check valve 30 and the radial bore 31 in the terminal position, that is, when the frontal face of the control piston is pressed against a sealing, such as the right seal 28 of the plug 23. The seal 28 may be pasted or vulcanized on the plug 23, and it is equally possible to give the seal the shape of a hollow rivet so that it merely needs to be buttoned into the port of the plug 23.

I claim:

1. A cross-flow controlling valve comprising a casing having an axially elongated closed ended bore therein with said bore having a first end face and an opposite second end face, a first opening in said casing opening through said first end face into said bore, a second opening in said casing opening through said second end face into said bore, said bore comprising a first terminal portion extending axially from said first end face, a second terminal portion extending axially from said second end face and an intermediate portion aligned with extending between and interconnecting said first and second terminal portions, said intermediate portion having a smaller diameter than said first and second terminal portions, an axially elongated piston member located within said bore and having a first end located in said first terminal portion of said bore and a second end located in said second terminal portion and said piston having a length between said first and second ends thereof greater than the length of said intermediate portion of said bore and smaller than the length between said first and second end faces of said bore, said piston having an outside diameter so that it is closely spaced from the surface of and freely slidable within said intermediate bore, said piston having a first groove formed into the outside circumferential periphery thereof with the groove extending in the axial direction of said piston and having a length slightly longer than the axial length of said intermediate portion of said bore and less than the axial length of said piston with the ends of the first groove spaced inwardly from the first and second ends of said piston, the opposite ends of said axially extending first groove forming a first shoulder closer to the first end of said piston and a second shoulder closer to the second end of said piston, said casing having a third opening into the intermediate portion of said bore in spaced relation to the ends of said intermediate portion and in flow communication with said first and second terminal portions, said piston having a second groove formed in the outside circumferential periphery thereof and extending transversely of the axial direction of said piston and spaced from said first and second shoulders of said first groove, said second groove being in flow communication with said first groove, said third opening being open into said second groove and said second groove having a width in the axial direction of said piston so that said third opening remains in flow communication with said second groove over any axial displacement of said piston in said bore, and the circumferential periphery of said piston between said shoulders and the adjacent ends of said piston being dimensioned for affording flow between the associated terminal portions and said first groove when said shoulders are displaced inwardly into said intermediate portion of said bore.

2. A cross-flow controlling valve, as set forth in claim 1, wherein said second groove is symmetrical relative to a plane extending transversely of and bisecting said piston.

3. A cross-flow controlling valve, as set forth in claim 1, wherein said first end of said piston being located in said first terminal portion of said bore and said second end of said piston being located in said second terminal portion of said bore, said first end of said piston arranged to form a seal for the first opening in said casing when said first end of said piston contacts said first end face and said second end of said piston arranged to form a seal for the second opening in said casing when said second end of said piston contacts said second end face.

4. A cross-flow controlling valve, as set forth in claim 1, wherein the length between said first shoulder and said first end of said piston and between said second shoulder and said second end of said piston being equal and being dimensioned so that when said first end of said piston contacts said first end face said first shoulder is located within said first terminal portion and said second shoulder is located within said intermediate portion and when said second end of said piston contacts said second end face of said casing said second shoulder being located within said second terminal portion and said first shoulder being located within said intermediate portion of said bore.

5. A cross-flow controlling valve, as set forth in claim 1, wherein said piston having an axially extending main bore extending between said first and second ends thereof with an opening through each of said first and second ends communicating with said main bore, a first check valve positioned within said bore in said piston and closing the opening in said first end thereof, a second check valve positioned within said bore in said piston and closing the opening in the second end thereof, means within said main bore in said piston for biasing said first and second check valves into a closed position blocking flow from said bore out of said piston while permitting flow inwardly into said bore in said piston and said piston having a radially extending branch bore therein intermediate the first and second ends thereof and communicating between said main bore and said second groove in said piston.

6. A cross-flow controlling valve, as set forth in claim 1, wherein a seal located on each of said first and second end faces of said casing encircling one of said first and second openings therethrough and being arranged to be contacted by the corresponding first end and second end of said piston for forming a seal.

* * * * *